Patented Jan. 12, 1954

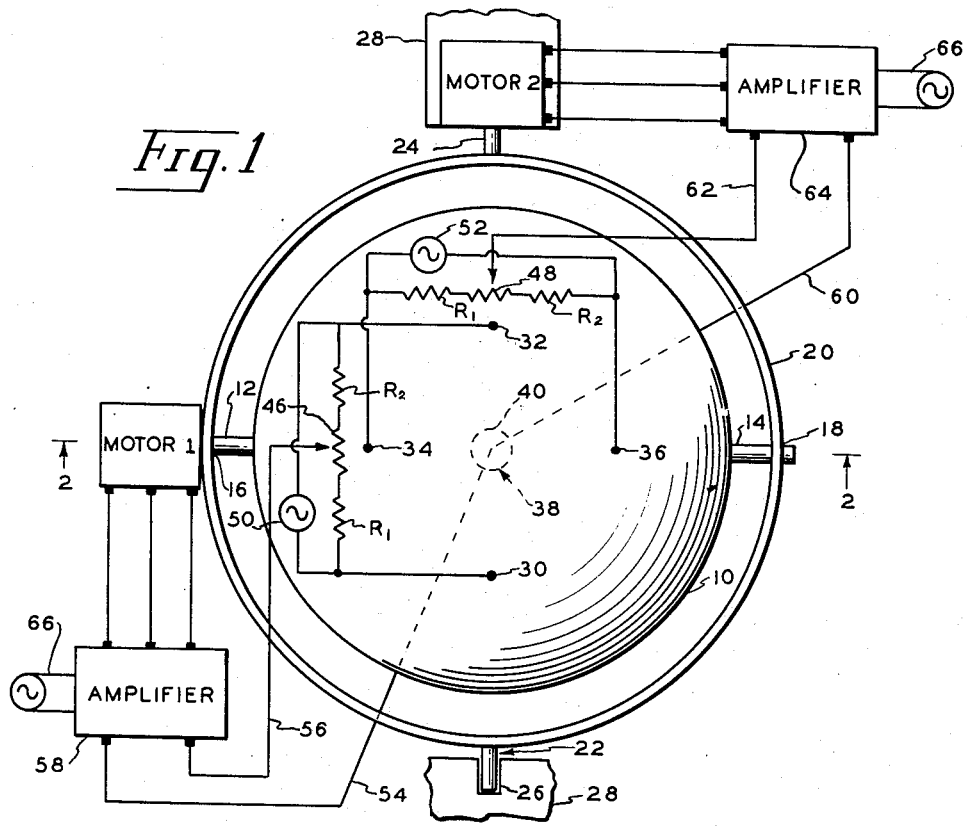
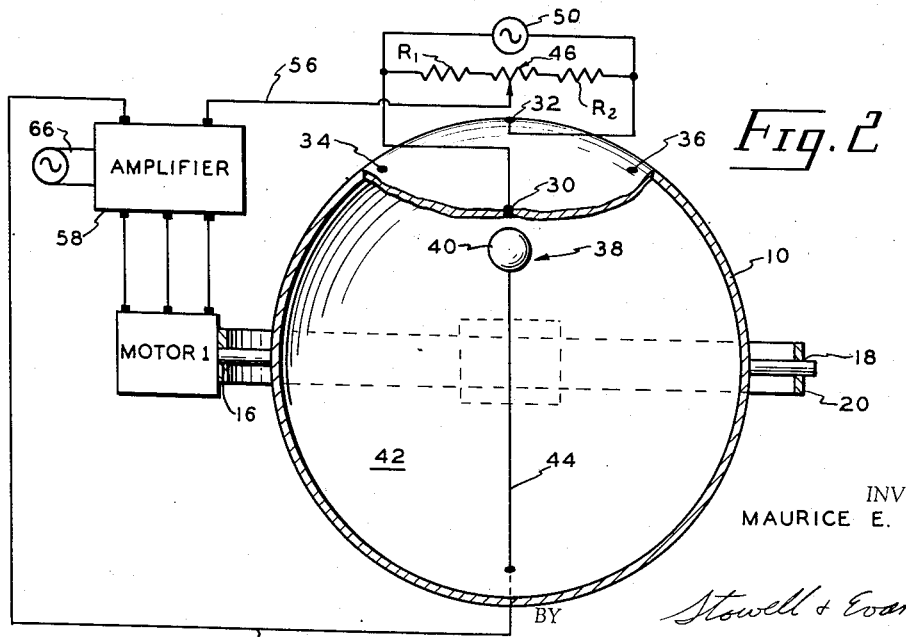

2,665,497

UNITED STATES PATENT OFFICE 2,665,497

POSITIONAL REFERENCE DEVICE

Maurice E. Bates, North Amherst, Mass.

Application October 22, 1951, Serial No. 252,486

2 Claims. (Cl. 33—206)

This invention relates to a positional reference device particularly adapted for use in the navigation of ships, airplanes, tanks and the like or for gunfire control, and other purposes where a stable positional reference is desired.

In the past it has been the standard practice to employ gyroscopic devices when a stable positional reference was desired. However, such devices have not proven entirely satisfactory because of their large size and weight, their high cost, and also because of the inherent limitations due to the mechanical and dynamic characteristics of the gyroscope itself.

It is therefore a principal object of the invention to provide a positional reference device wherein the inherent limitations due to the mechanical and dynamic characteristics of the gyroscope are substantially eliminated.

Another object of the invention is to provide a positional reference device which is simple as to its parts, inexpensive to manufacture and readily adaptable to various operating conditions and requirements.

A further object of the invention is to provide such a device that is compact, light in weight, and with few moving or precision parts.

Another object is to provide such a device having an extremely wide range of operation.

These and other objects and advantages are provided by the stable reference device of the invention which generally comprises a hollow spherical member filled with a liquid, means mounting the hollow member for rotation about two coplanar horizontal axes, motor means for rotating the hollow member about each of the axes, and control means for the motor means comprising four electrodes symmetrically positioned at angular separations of 90° in the periphery of the hollow member outside the plane of the axes, a pair of the electrodes being positioned in a plane perpendicular to each of said axes, an internal electrode member supported within the hollow member by a flexible conductor normally perpendicular to the plane of the axes, circuit elements connecting each of the pairs of electrodes and the internal electrode member to a power control device actuating the motor means rotating the hollow member about the axis perpendicular to the plane in which the pair of electrodes lies to provide a balanced circuit when the internal electrode is symmetrically positioned with respect to the pair of electrodes and to actuate the power control device when the circuit is unbalanced on displacement of the internal electrode from such position of symmetry to rotate the hollow member in a direction to restore the internal electrode to such position of symmetry.

The invention will be more particularly described with reference to an illustrative embodiment of a preferred form thereof shown in the accompanying drawings in which:

Fig. 1 is a diagrammatic representation in plan of the apparatus of the invention with portions thereof shown in block form; and Fig. 2 is a side view of the apparatus shown in Fig. 1 with the sphere rotated slightly on the axis in the plane of the drawing, a portion of the apparatus being shown in section, and other portions being removed for clarity.

With reference to the illustrative embodiments of the invention 10 is the shell of a hollow, non-electrically conductive sphere. The sphere is mounted for rotation about one of its diameters on axles 12 and 14 journaled in bearings 16 and 18 of the gimbal ring 20. Axle 12 is an extension of the armature shaft of a reversible follow-up motor 1. The stator of the motor 1 is secured to the outer periphery of the gimbal ring 20, whereby upon actuation of the motor 1 the sphere is rotated about axles 12 and 14.

The gimbal ring 20 is mounted for pivotal movement on axles 22 and 24 which are positioned at right angles to the axis of rotation of sphere 10 about axles 12 and 14. Axle 22 is journaled in a bearing 26 and axle 24 is an extension of the armature shaft of the reversible follow-up motor 2. The stator of motor 2 and the bearing 26 are rigidly attached to the frame 28 of an airplane or the like, only a portion of which is shown in the drawings. Thus it will be seen that the sphere is mounted for rotation in two planes, which intersect at right angles, and the sphere has two degrees of freedom of motion with respect to its supporting frame 28, whereby if the reversible follow-up motors 1 and 2 are energized in the proper amount and sense, they can maintain the sphere in a fixed vertical reference position regardless of the relative motion between the sphere and the supporting frame 28. The stable reference sphere may then be used to maintain any desired equipment in the same relative position as the sphere itself.

The means for electrically energizing the follow-up motors 1 and 2 with electrical energy of the proper amount and sense generally comprises four fixed electrical contacts 30, 32, 34 and 36 positioned in the top of the sphere, a movable electrode 38 flexibly secured to the bottom of the sphere, a pair of electrical circuits connecting the movable electrode and two of the fixed electrodes with each of the follow-up motors.

The movable electrode 38 comprises a spherical conducting float 40 and a flexible filament 44. The float is suspended in a body of conducting liquid 42, away from the inner surface of the sphere 10 by the thin flexible conducting filament 44 attached to the bottom of the sphere. As is clearly shown in the drawings, the float 40 is positioned a substantial distance from the wall of the sphere to remove it from the influence of any local disturbances caused by the layer of fluid next to the wall of the sphere.

In the preferred form of the invention, the density of the conducting fluid 42 and the density of float 40 are adjusted so that they are nearly the same, whereby the effect of acceleration and deceleration of the supporting craft will not significantly move the conducting float 40 out of its normal position in the fluid 42. It is contemplated, however, that the relative densities between the float and the conducting liquid may be variously adjusted to either shorten or lengthen the long-period pendulum effect of the device and that the differential in density between the fluid and the float may be maintained by enclosing the sphere in a temperature-controlled thermally-insulated box.

The four fixed electrodes 30 through 36 are symmetrically spaced in the top of the sphere, equally distant from the point of attachment of the filament 44 to the bottom of the sphere so that when the sphere is in the normal position, equal resistance is provided by the conductive liquid 42 between the float 40 and each of the fixed electrodes.

It is desirable to so position the fixed electrodes with respect to the floating electrode that the relative displacement of the floating electrode from the fixed electrodes for a given movement of the sphere is at a maximum.

As is clearly shown in Fig. 1 of the drawings, electrodes 30 and 32 are positioned in a plane of the sphere at right angles to the axis of rotation of motor 1, and electrodes 34 and 36 are in a plane at right angles to the axis of rotation of the motor 2.

Each of the fixed electrode pairs 30—32 and 34—36 is connected by resistances designated $R_1$ and $R_2$, a zero adjustment resistance 46 and 48, respectively, and a power source 50 and 52.

Electrical conductors 54 and 56 connect the filament 44 and the zero adjustment resistance 46 respectively to an amplifier and relay 58, which in turn is connected to the follow-up motor 1. Similarly, conductors 60 and 62 connect the filament 44 and the resistance 48, respectively, to an amplifier and relay 64, which is in turn connected to the follow-up motor 2. Each of the amplifiers and relays 58 and 64 is provided with a power supply generally designated 66. Thus it will be seen that the circuitry for each follow-up motor consists of a resistance bridge, an amplifier and relay, and a power supply.

In operation, when the supporting craft is level and the spherical shell 10 is vertical, a balanced current flows between the float 40 and the fixed electrodes 30 through 36 which are arranged in two bridge systems as hereinbefore explained. When, however, motion in the supporting craft causes the spherical shell 10 to rotate, the float 40 and its supporting fluid 42 remain substantially free from any rotational disturbance and the balanced flow of current from the float to the fixed electrodes is disrupted as the four paths are no longer of the same length and hence not of the same resistance. This upset of the current balance immediately causes one or the other, or both, of the follow-up motors to rotate the sphere back to its initial equilibrium position.

The types of amplifiers and relays which are employed in the electrical system will depend on the character of the electrical current used and the sensitivity required of the system, and it is contemplated that suitable electrical or mechanical damping devices may be employed either in the amplifier power supply system or in the follow-up motors or the motor drives to decrease hunting and oscillation of the reference device. While the specific form of the invention shown in the drawings and above described provides for an internal electrode of less specific gravity than the liquid within the sphere, it is evident that an internal electrode of greater density than the conducting or resistance fluid may be employed in stable reference devices constructed in accordance with the principles of the invention. In reference devices wherein the internal electrode is of the greater density, the normal position of the reference device would be with the paired fixed electrodes in a downwardly direction and with the internal electrode suspended from the top of the spherical shell.

From the foregoing description it will be seen that the present invention provides an improved stable position reference device whereby the aims, objects and advantages of the invention are fully accomplished.

It will be evident, however, that various modifications may be made in the construction of the device and in the form of the electrical control circuits employed thereon. For example, in order to save weight and space and to insure a balanced response to motion in all directions of rotation of the spherical shell, one amplifier and relay or power control device may be used to control both of the follow-up motors. In installations where the single amplifier is used, a system of synchronous switches would alternately connect each of the follow-up motors with its corresponding bridge circuit through the power control device.

It is further contemplated that an insulating fluid may be used in the sphere instead of the conducting fluid 42 as hereinbefore described, thus utilizing the change in capacitance between the float 40 and the fixed electrodes instead of a change in resistance as the sphere is rotated. In installations employing the insulating fluid within the spherical shell, the bridge circuits would operate on an alternating current supply.

I claim:

1. A positional reference device comprising a hollow member having a spherically shaped upper surface and filled with a conducting liquid, means mounting said spherical member for rotation about two coplanar horizontal axes, motor means for rotating said spherical member about each of said axes, control means for said motor means comprising four electrodes symmetrically positioned at angular separations of 90° in the spherically shaped upper surface of said hollow member outside the plane of said axes, a pair of said electrodes being positioned in a plane perpendicular to each of said axes, a spherical electrode of slightly less density than the conducting liquid whereby the effect of acceleration and deceleration of the hollow member will not move the spherical electrode substantially out of its normal position supported within said hollow member by a flexible conductor attached to the bottom of the hollow member, the length of said flexible conductor being so selected that said spherical floating electrode is spaced a substantial distance from the inner spherical surface of said hollow member to remove said electrode from the influence of any local disturbances caused by the layer of fluid next to the wall of the hollow member, circuit elements connecting each of said pairs of electrodes and said internal electrode member to a power control device actuating the motor means rotating the hollow member about the axis perpendicular to the plane in which said pair of electrodes lies to provide a balanced circuit when the internal electrode is symmetrically positioned with respect to said pair of electrodes and to actuate said power control device when the circuit is unbalanced on displacement of the internal electrode from such position of symmetry to rotate said hollow member in a direction to restore the internal electrode to such position of symmetry.

2. A positional device as defined in claim 1 wherein each pair of said electrodes and said spherical electrode are connected in a loop of four resistances to provide a Wheatstone bridge, and said power control device for actuating the motor means is bridged between the loop.

MAURICE E. BATES.

References Cited in the file of this patent

UNITED STATES PATENTS

| Number | Name | Date |
|---|---|---|
| 1,228,061 | Schuler | May 29, 1917 |
| 1,318,196 | Case | Oct. 7, 1919 |
| 1,836,079 | McBride | June 19, 1928 |
| 2,067,467 | Urfer | Jan. 12, 1937 |
| 2,193,707 | Baumann | Mar. 12, 1940 |
| 2,252,727 | Pepper | Aug. 19, 1941 |

FOREIGN PATENTS

| Number | Country | Date |
|---|---|---|
| 465,373 | France | Feb. 4, 1914 |
| 239,376 | Great Britain | Apr. 15, 1925 |